US012594833B2

(12) United States Patent
Ozawa et al.

(10) Patent No.: US 12,594,833 B2
(45) Date of Patent: Apr. 7, 2026

(54) DISPLAY CONTROL DEVICE

(71) Applicant: J-QuAD DYNAMICS Inc., Tokyo (JP)

(72) Inventors: Yuuki Ozawa, Tokyo (JP); Koji Shibata, Tokyo (JP); Yusuke Minamoto, Tokyo (JP)

(73) Assignee: J-QuAD DYNAMICS Inc., Tokyo (JP)

( * ) Notice: Subject to any disclaimer, the term of this patent is extended or adjusted under 35 U.S.C. 154(b) by 106 days.

(21) Appl. No.: 18/441,364

(22) Filed: Feb. 14, 2024

(65) Prior Publication Data

US 2024/0181885 A1     Jun. 6, 2024

Related U.S. Application Data

(63) Continuation of application No. PCT/JP2022/011535, filed on Mar. 15, 2022.

(30) Foreign Application Priority Data

Aug. 16, 2021     (JP) ................................. 2021-132118

(51) Int. Cl.
B60K 35/28          (2024.01)
B60K 35/10          (2024.01)
(Continued)

(52) U.S. Cl.
CPC .............. B60K 35/28 (2024.01); B60K 35/10 (2024.01); B60K 35/22 (2024.01); B60K 35/81 (2024.01);
(Continued)

(58) Field of Classification Search
CPC ........ B60K 35/28; B60K 35/81; B60K 35/10; B60K 35/22; B60W 50/14; B60W 2540/223; B60W 2050/146; B60W 2520/105; B60W 2520/125; B60W 2540/18
See application file for complete search history.

(56) References Cited

U.S. PATENT DOCUMENTS

2009/0179987 A1*  7/2009  Kim ........................ G06F 3/011
                                                              345/619
2011/0205044 A1*  8/2011  Enomoto .................. B60L 7/12
                                                              340/439
(Continued)

FOREIGN PATENT DOCUMENTS

JP          2005153708 A      6/2005
JP          2006248450 A      9/2006
(Continued)

*Primary Examiner* — Naeem Taslim Alam
(74) *Attorney, Agent, or Firm* — Harness, Dickey & Pierce, P.L.C.

(57)          ABSTRACT
A display control device executes a calculation acceleration acquisition processing and a display processing. The calculation acceleration acquisition processing includes a process of acquiring a calculation acceleration variable that indicates a calculated acceleration of a vehicle in response to a driving state of the vehicle or a driving state of the vehicle that generates the calculated acceleration. The display processing includes a process of displaying an image that is visible to an occupant of the vehicle by operating a display device, and includes an image variation process of changing the image in response to the calculation acceleration variable.

13 Claims, 7 Drawing Sheets

(51) Int. Cl.
    *B60K 35/22*        (2024.01)
    *B60K 35/81*        (2024.01)
    *B60W 50/14*        (2020.01)

(52) U.S. Cl.
    CPC ....... *B60W 50/14* (2013.01); *B60W 2050/146*
        (2013.01); *B60W 2520/105* (2013.01); *B60W*
      *2520/125* (2013.01); *B60W 2540/18* (2013.01);
                     *B60W 2540/223* (2020.02)

(56)               References Cited

U.S. PATENT DOCUMENTS

| | | | |
|---|---|---|---|
| 2011/0241864 A1* | 10/2011 | Fujiki | B60K 35/29 |
| | | | 340/439 |
| 2021/0023984 A1* | 1/2021 | Kühne | B60Q 1/2673 |
| 2021/0271124 A1* | 9/2021 | Peso | A61M 21/02 |
| 2022/0020119 A1* | 1/2022 | Grace | G06F 3/013 |
| 2022/0238083 A1* | 7/2022 | Sasayama | G06F 3/015 |
| 2024/0013501 A1* | 1/2024 | Sasayama | G06T 7/70 |

FOREIGN PATENT DOCUMENTS

| | | |
|---|---|---|
| JP | 2008242251 A | 10/2008 |
| JP | 2013148715 A | 8/2013 |

\* cited by examiner

DISPLAY CONTROL DEVICE

CROSS REFERENCE TO RELATED APPLICATIONS

The present application is a continuation application of International Patent Application No. PCT/JP2022/011535 filed on Mar. 15, 2022, which designated the U.S. and claims the benefit of priority from Japanese Patent Application No. 2021-132118 filed on Aug. 16, 2021. The entire disclosures of all of the above applications are incorporated herein by reference.

TECHNICAL FIELD

The present disclosure relates to a display control device.

BACKGROUND

A vehicle is equipped with a device for displaying images such as television, movie, or game. Another device is provided to display a background image around the images, so as to change according to a detected value of acceleration of the vehicle. This process is performed in consideration of the fact that a car sickness can be suppressed by allowing an occupant of the vehicle to anticipate the behavior of the vehicle. In other words, the car sickness is suppressed by making the occupant to anticipate the behavior of the vehicle based on the background image.

SUMMARY

According to an aspect of the present disclosure, a display control device includes: at least one of (i) a circuit and (ii) a processor having a memory storing computer program code. The at least one of the circuit and the processor having the memory is configured to cause the display control device to execute a calculation acceleration acquisition processing and a display processing. The calculation acceleration acquisition processing includes a process of acquiring a calculation acceleration variable. The calculation acceleration variable is a variable indicating a calculated acceleration of a vehicle in response to a driving state of the vehicle, or a driving state of the vehicle that generates an acceleration of the vehicle. The display processing includes a process of displaying an image that is visible to an occupant of the vehicle by operating a display device, and includes an image variation process. The image variation process includes a process of changing the image in response to the calculation acceleration variable.

BRIEF DESCRIPTION OF DRAWINGS

The present disclosure will become more apparent from the following detailed description made with reference to the accompanying drawings. In the drawings.

DETAILED DESCRIPTION

Figure 1:
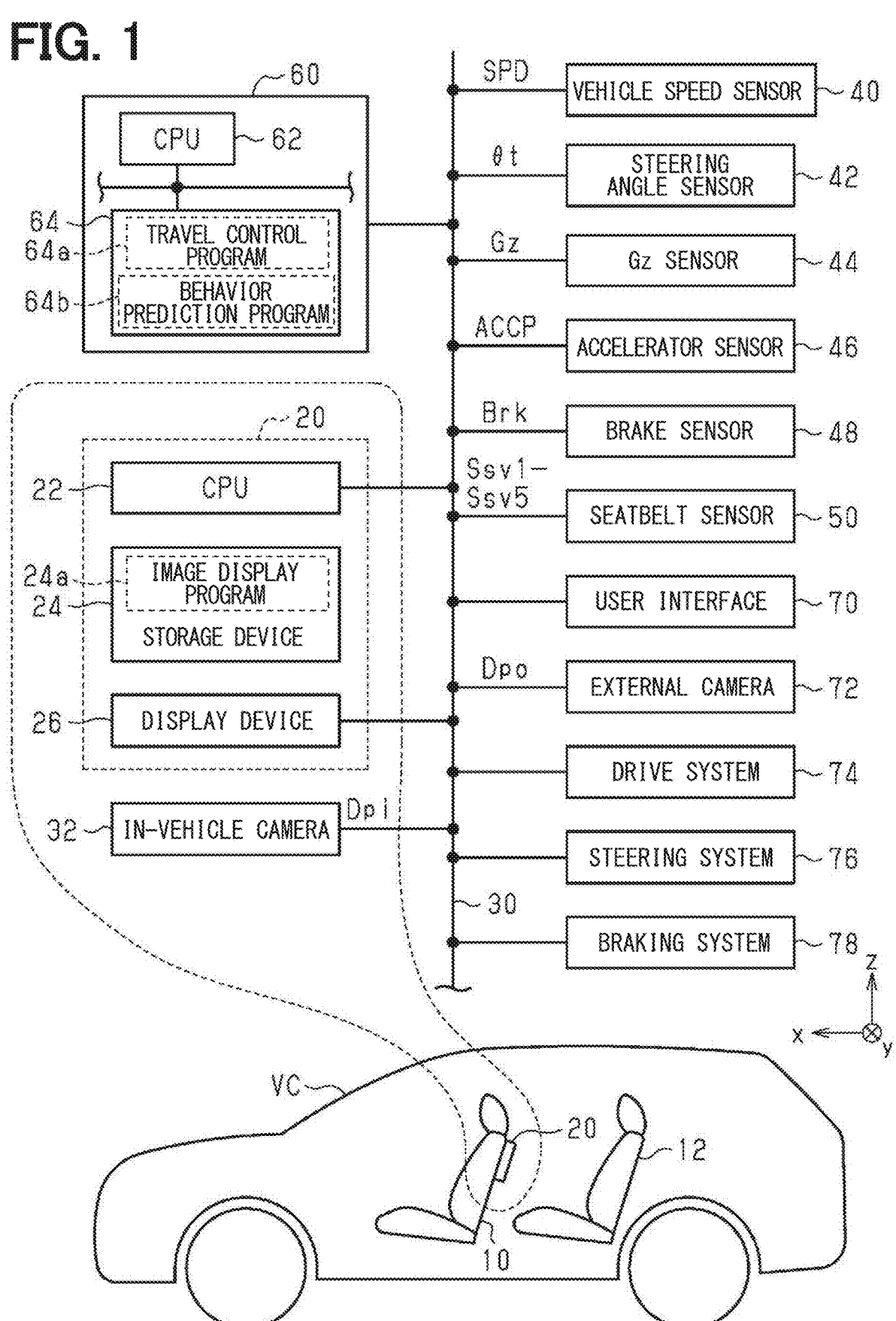
FIG. 1 is a diagram showing an internal configuration of a vehicle according to an embodiment.

A vehicle is equipped with a device for displaying images such as television, movie, or game. A device is provided to display a background image around the images to change according to a detected value of acceleration of the vehicle. This process is performed in consideration of the fact that a car sickness can be suppressed by allowing an occupant of the vehicle to anticipate the behavior of the vehicle. In other words, the aim is to suppress the car sickness by making the occupant to anticipate the behavior of the vehicle based on the background image.

When changing the background image based on the detected value of an acceleration sensor, there is a possibility that the background image lags behind the actual movement of the vehicle.

In a first aspect of the present disclosure, a display control device includes: a computer configured to execute a calculation acceleration acquisition processing and a display processing. The calculation acceleration acquisition processing includes a process of acquiring a calculation acceleration variable. The calculation acceleration variable is a variable indicating a calculated acceleration of a vehicle according to a driving state of the vehicle, or a driving state of the vehicle that generates an acceleration of the vehicle. The display processing includes a process of displaying an image that is visible to an occupant of the vehicle by operating a display device, and includes an image variation process. The image variation process is a process of changing the image in response to the calculation acceleration variable.

The calculation acceleration variable is a variable that indicates an acceleration of the vehicle. Therefore, in the above configuration, the image can be changed in accordance with the acceleration of the vehicle by changing the image visible to the occupant of the vehicle using the calculation acceleration variable as input. Accordingly, the occupant can anticipate the behavior of the vehicle based on the image. In the above configuration, the image is changed not according to the detected value of acceleration but according to the driving state of the vehicle that contributes to the generation of acceleration. Therefore, the responsiveness of the image display to the behavior of the vehicle can be improved compared to the case where the detected value is used.

An embodiment of the present disclosure will be described with reference to the accompanying drawings. A vehicle VC shown in FIG. 1 includes a front seat 10 and a rear seat 12. A display control device 20 is provided on the seat back of the front seat 10.

The display control device 20 includes a CPU 22, a storage device 24, and a display device 26. The display device 26 includes, for example, a liquid crystal display panel or an organic EL display panel. The display control device 20 executes a process of displaying an image on the display device 26 by having the CPU 22 execute an image display program 24a stored in the storage device 24.

At this time, signals from various devices in the vehicle VC are input to the display control device 20 via the in-vehicle network 30. For example, in-vehicle image data Dpi, which is image data of the in-vehicle image taken by the in-vehicle camera 32, is input to the display control device 20. In this embodiment, the in-vehicle camera 32 is arranged at a position to take an image of the head of the occupant in the rear seat 12. The in-vehicle camera 32 is an example of a sensing device that senses the behavior of the head of an occupant inside the vehicle VC.

Furthermore, the vehicle speed SPD detected by the vehicle speed sensor 40 is input to the display control device 20. Furthermore, the steering angle θt, which is the steering angle of the tire of the vehicle VC, detected by the steering angle sensor 42 is input to the display control device 20. Further, the vertical acceleration Gz, which is acceleration of the vehicle in the vertical direction, detected by the Gz sensor 44 is input to the display control device 20. Note that FIG. 1 shows that the longitudinal direction of the vehicle VC is the x-axis direction. FIG. 1 shows that the frontward direction of the vehicle VC corresponds to the positive direction of the x-axis. Further, FIG. 1 shows that the lateral direction of the vehicle VC corresponds to the y-axis direction. FIG. 1 shows that the rightward direction of the vehicle VC corresponds to the positive direction of the y-axis. Further, FIG. 1 shows that the vertical direction of the vehicle VC is the z-axis direction. FIG. 1 shows that the upward direction of the vehicle VC corresponds to the positive direction of the z-axis.

Furthermore, various signals from the travel control ECU 60 are input to the display control device 20. The travel control ECU 60 grasps the user's intention through the user interface 70. That is, when the user operates the user interface 70 to instruct automatic driving, the vehicle VC is automatically driven. At this time, the travel control ECU 60 refers to external image data Dpo, which is image data of the surroundings of the vehicle VC captured by the external camera 72. The travel control ECU 60 includes a CPU 62 and a storage device 64. The travel control ECU 60 executes automatic driving by causing the CPU 62 to execute the travel control program 64a stored in the storage device 64. That is, the travel control ECU 60 causes the vehicle VC to travel by operating the drive system 74. The travel control ECU 60 turns the vehicle VC by steering the wheels by operating the steering system 76. Further, the travel control ECU 60 decelerates and stops the vehicle VC by operating the braking system 78.

The travel control ECU 60 executes a process of predicting the behavior of the vehicle VC, regardless of whether automatic driving is executed or not. This is realized by the CPU 62 executing the behavior prediction program 64b stored in the storage device 64. The travel control ECU 60 refers to the accelerator operation amount ACCP, which is the amount of depression of the accelerator pedal detected by the accelerator sensor 46, when predicting the behavior in case where the vehicle is not in the automatic driving mode. The travel control ECU 60 also refers to the brake operation amount Brk, which is the amount of depression of the brake pedal detected by the brake sensor 48. The travel control ECU 60 also refers to belt status variables Ssv1 to Ssv5, which are the status of the seatbelt, detected by the seatbelt sensor 50. Five belt state variables Ssv1 to Ssv5 respectively indicate the states of the seat belts in the vehicle VC.

Specifically, the CPU 62 estimates that the weight of the vehicle VC is heavier when the number of belt state variables Ssv1 to Ssv5 in the fastened state is larger than when the number is smaller. Further, the CPU 62 calculates the estimated front-rear acceleration Gxe, which is the estimated value of the front-rear acceleration Gx, to a larger value when the accelerator operation amount ACCP is larger than when the accelerator operation amount ACCP is smaller. While the accelerator operation amount ACCP is the same, the CPU 62 calculates the estimated front-rear acceleration Gxe as a larger value when the vehicle speed SPD is smaller than when the vehicle speed SPD is larger. While the accelerator operation amount ACCP is the same, the CPU 62 estimates the estimated front-rear acceleration Gxe as a smaller value when the vehicle VC is heavier than when vehicle VC is lighter. Further, the CPU 62 calculates the estimated front-rear acceleration Gxe as a negative value with a larger absolute value when the brake operation amount Brk is larger than when the brake operation amount Brk is smaller. While the brake operation amount Brk is the same, the CPU 62 calculates the estimated front-rear acceleration Gxe to a negative value with a larger absolute value when the vehicle speed SPD is smaller than when the vehicle speed SPD is larger. While the brake operation amount Brk is the same, the CPU 62 calculates the estimated front-rear acceleration Gxe to a negative value with a smaller absolute value when the vehicle VC is heavier than when the vehicle VC is lighter.

Figure 2:
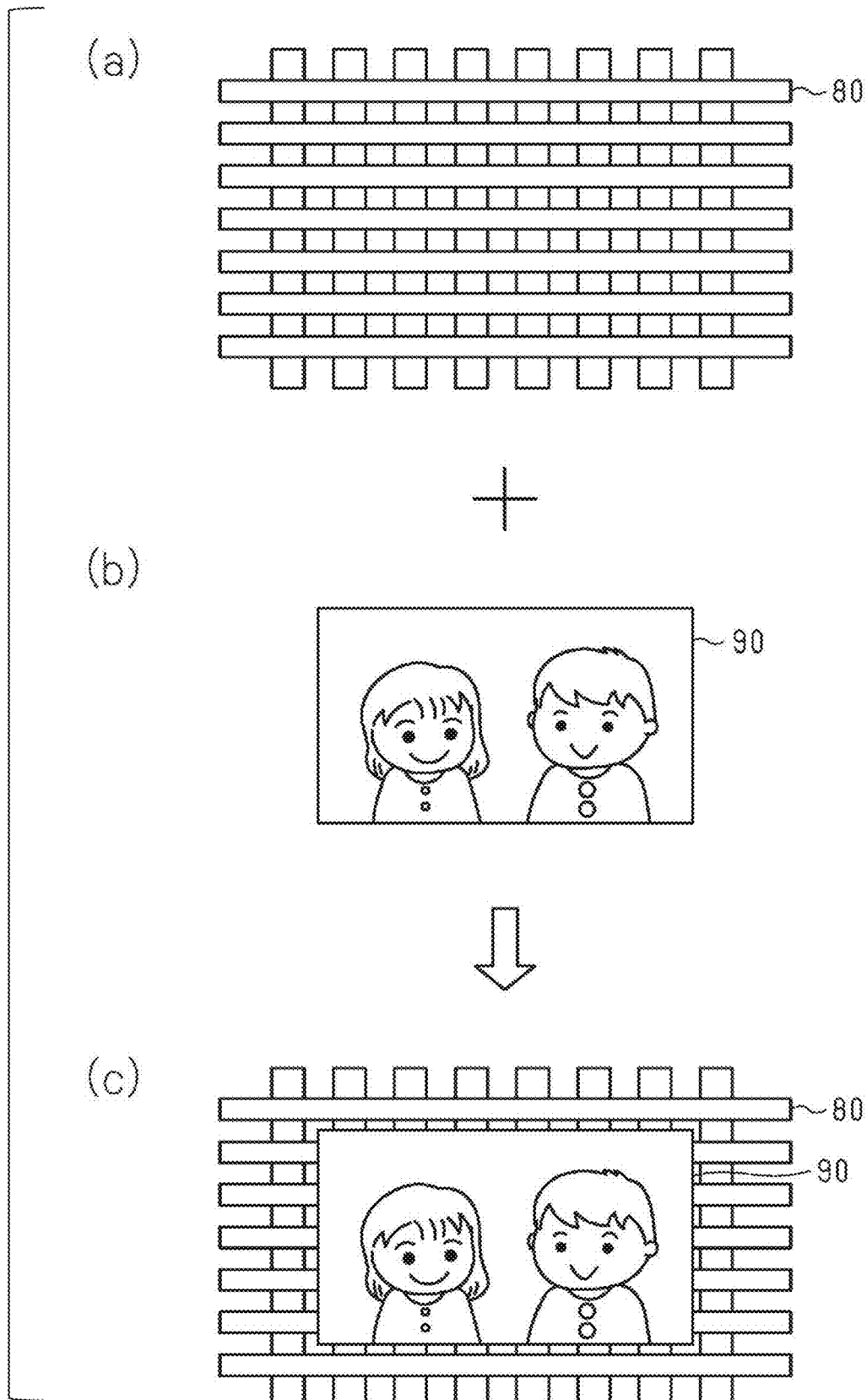
FIG. 2 is a diagram illustrating images displayed on a display device.

The display control device 20 displays, on the display device 26, images of television, internet videos, etc. that the occupant desires, and also displays surrounding images to suppress car sickness. FIG. 2 illustrates an example of images displayed on the display device 26.

In FIG. 2, (a) represents a peripheral image 80. The peripheral image 80 is a checkered pattern image. Specifically, vertical stripes and horizontal stripes are superimposed in the peripheral image 80. In FIG. 2, (b) illustrates a main image 90 desired by the occupant. In FIG. 2, (c) shows a display example of an image displayed on the display device 26. As shown in (c) of FIG. 2, on the display device 26, the peripheral image 80 is displayed around the main image 90.

The display control device 20 attempts to suppress car sickness of the occupant viewing the main image 90 by changing the peripheral image 80 according to the state of the vehicle VC. Below, the processes for changing peripheral image 80 are described in order of a process in response to a request for acceleration in the longitudinal direction of the vehicle VC, a process during a turning of the vehicle, a process according to the vertical movement of the vehicle VC, and a displacement process of the peripheral image.

"Process in Response to a Request for Acceleration in the Longitudinal Direction of the Vehicle"

Figures 3, 4:
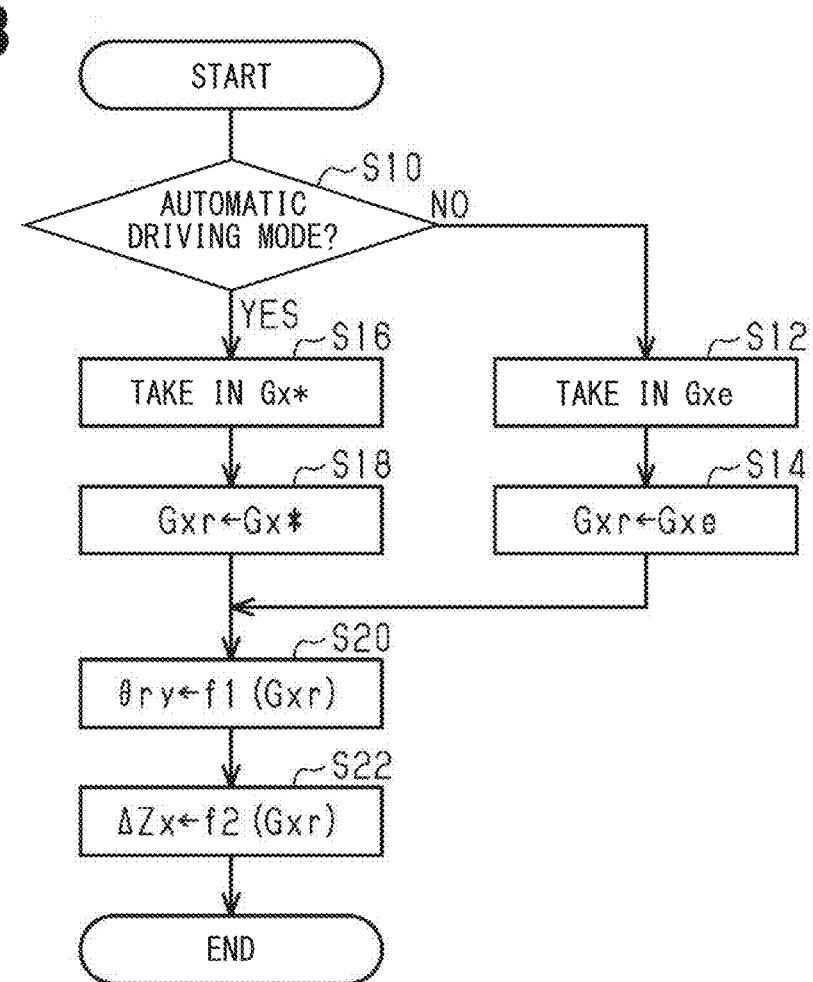
FIG. 3 is a flowchart showing a procedure of processing executed by a display control device according to the embodiment.
FIG. 4 is a diagram illustrating changes in a peripheral image according to a front-rear acceleration of the vehicle in the embodiment.

FIG. 3 shows a procedure of processing in response to a request for acceleration in the longitudinal direction of the vehicle VC. The processing shown in FIG. 3 is realized by the CPU 22 repeatedly executing the image display program 24a stored in the storage device 24, for example, at a predetermined period. Hereinafter, the step number of each process is represented by a number prefixed with "S".

In the series of processes shown in FIG. 3, the CPU 22 determines whether the automatic driving mode is set (S10). This determination can be realized, for example, when the travel control ECU 60 is executing automatic driving, by outputting a flag indicating that automatic driving is being performed to the display control device 20. When the CPU 22 determines that the mode is not the automatic driving mode (S10: NO), the CPU 22 takes in the estimated front-rear acceleration Gxe calculated by the travel control ECU 60 (S12). Next, the CPU 22 substitutes the estimated front-rear acceleration Gxe to the display front-rear acceleration Gxr (S14).

When the CPU 22 determines that the mode is automatic driving mode (S10: YES), the CPU 22 takes in the required front-rear acceleration Gx* calculated by the travel control ECU 60 during automatic driving (S16). Next, the CPU 22 substitutes the requested front-rear acceleration Gx* to the display front-rear acceleration Gxr (S18).

Steps S12 and S16 described above are an example of the calculation acceleration acquisition process in this embodiment. The calculation acceleration acquisition process is a process of acquiring a calculation acceleration variable (for example, display front-rear acceleration Gxr). The calculation acceleration variable (for example, display front-rear acceleration Gxr) is a calculated acceleration of the vehicle VC according to the driving state of the vehicle VC (for example, the estimated front-rear acceleration Gxe) or a variable representing the driving state of the vehicle VC that generates the acceleration of the vehicle VC (for example, the requested front-rear acceleration Gx*).

When completing the process of S14 or S18, the CPU 22 calculates the y-axis rotation amount θry, which is a rotation amount of the peripheral image 80 around the rotation axis ry, based on the display front-rear acceleration Gxr (S20). The rotation axis ry is parallel to the y-axis, and is located at the center of the display panel in the display device 26 in the vertical direction. Note that the positive direction of the rotation axis ry is the same as the positive direction of the y-axis. Further, the CPU 22 calculates the Z-direction displacement amount ΔZx, which is the displacement amount of the peripheral image 80 in the Z-axis direction, based on the display front-rear acceleration Gxr (S22). Steps S20 and S22 described above are an example of display processing in this embodiment. Further, steps S20 and S22 are an example of image variation process in this embodiment. In a preferred embodiment, the image variation process is a process of changing the peripheral image 80 when the calculation acceleration variable indicates acceleration in forward traveling of the vehicle VC with respect to when the vehicle VC travels at a constant speed. Further, the image variation process includes a process (S20, S22) for changing the amount of change of the peripheral image 80 according to the calculation acceleration variable in case where the front-rear acceleration is greater than zero, such that the magnitude of the front-rear acceleration becomes greater when the amount of change in the peripheral image 80 is larger compared with a case where the amount of change in the peripheral image 80 is smaller.

FIG. 4 illustrates the y-axis rotation amount θry and the Z-direction displacement amount ΔZx. As shown in FIG. 4, when the vehicle VC accelerates, the CPU 22 rotates the peripheral image 80 counterclockwise around the rotation axis ry. As a result, the upper side of the peripheral image 80 is displaced to the front of the vehicle VC, and the lower side of the peripheral image 80 is displaced to the rear of the vehicle VC. In other words, the upper side is displaced away from the occupant viewing the peripheral image 80, and the lower side is displaced closer to the occupant. This is done in consideration of the fact that when the vehicle VC accelerates, the direction of the composite vector of the acceleration of the vehicle VC and the gravitational acceleration shifts toward the rear of the vehicle VC with respect to the negative z-axis direction. Therefore, the occupant feels that his or her body is leaning toward the rear of the vehicle VC as the body is located upward. The peripheral image 80 is rotated to match the physical sensation. Furthermore, when the vehicle VC accelerates, the CPU 22 displaces the peripheral image 80 downward by the absolute value of the Z-direction displacement amount ΔZx.

When the vehicle VC decelerates, the CPU 22 rotates the peripheral image 80 clockwise around the rotation axis ry. As a result, the upper side of the peripheral image 80 is displaced to the front of the vehicle VC, and the lower side of the peripheral image 80 is displaced to the rear of the vehicle VC. In other words, the upper side is displaced toward the occupant viewing the peripheral image 80, and the lower side is displaced away from the occupant. This is in consideration of the fact that when the vehicle VC decelerates, the direction of the composite vector of the acceleration of the vehicle VC and the gravitational acceleration shifts toward the front of the vehicle VC with respect to the negative z-axis direction. Therefore, the occupant feels that his or her body is leaning toward the front of the vehicle VC as the body is located upward. The peripheral image 80 is rotated to match the physical sensation. Further, when the vehicle VC decelerates, the CPU 22 displaces the peripheral image 80 upward by the absolute value of the Z-direction displacement amount ΔZx.

Note that in this embodiment, the display device 26 has a two-dimensional display surface. Therefore, the peripheral image 80 is not actually rotated. Here, "rotating the peripheral image 80" means displaying an image obtained by rotating the peripheral image 80 by using perspective. That is, when the vehicle VC accelerates, the upper side of the striped pattern forming the peripheral image 80 is displayed smaller than the lower side.

The CPU 22 monotonically increases the absolute value of the y-axis rotation amount θry according to the absolute value of the display front-rear acceleration Gxr. This process includes a strong monotonicity increasing processing. Further, the CPU 22 monotonically increases the absolute value of the Z-direction displacement amount ΔZx in accordance with the absolute value of the display front-rear acceleration Gxr. This process includes a strong monotonicity increasing processing.

Specifically, the process of S20 may be performed by the CPU 22 using a map calculation of the y-axis rotation amount θry while the map data is stored in the storage device 24. The map data uses the display front-rear acceleration Gxr as an input variable and the y-axis rotation amount θry as an output variable. Further, the process of S22 may be calculated by the CPU 22 using a map of the Z-direction displacement amount ΔZx while the map data is stored in the storage device 24. The map data uses the display front-rear acceleration Gxr as an input variable and the Z-direction displacement amount ΔZx as an output variable.

The map data is set data of discrete values of input variables and values of output variables corresponding to the values of the input variables. Furthermore, when the value of the input variable matches any of the values of the input variables of the map data, the corresponding value of the output variable of the map data is used as the calculation result, in the map calculation. When the value of an input variable does not match any of the values of input variables in the map data, the calculation result is a value obtained by interpolating the values of multiple output variables included in the map data, in the map calculation.

When completing the process of S22, the CPU 22 temporarily ends the series of processes shown in FIG. 3.

"Process During a Turning of the Vehicle"

Figure 5:
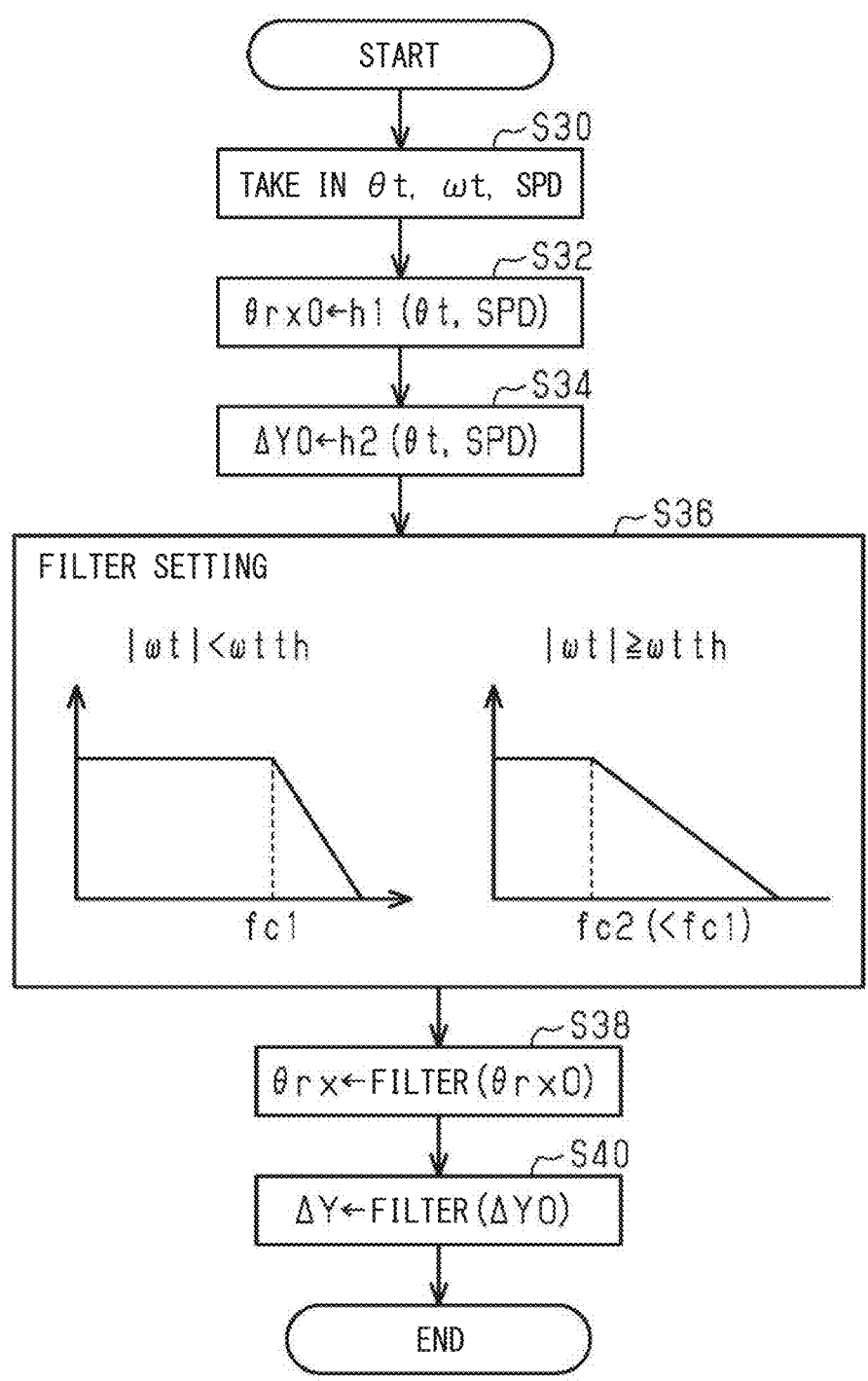
FIG. 5 is a flowchart showing a procedure of processing executed by a display control device according to the embodiment.

FIG. 5 shows a processing procedure when the vehicle turns. The process shown in FIG. 5 is realized by the CPU 22 repeatedly executing the image display program 24$a$ stored in the storage device 24, for example, at a predetermined period.

In the series of processes shown in FIG. 5, the CPU 22 obtains the steering angle θt, the steering angular velocity ωt, and the vehicle speed SPD that is the traveling speed of the vehicle VC (S30). Note that the steering angular velocity ωt is calculated by the CPU 22 based on the steering angle θt. Next, the CPU 22 calculates the x-axis rotation amount θrx0 of the peripheral image 80 around the rotation axis rx based on the steering angle θt and the vehicle speed SPD (S32). The rotation axis rx is parallel to the x-axis and passes through the center of the display panel. Further, the CPU 22 calculates the Y-direction displacement amount ΔY0, which is a displacement amount of the peripheral image 80 in the y-axis direction, based on the steering angle θt and the vehicle speed SPD (S34). Step S30 described above is also an example of the calculation acceleration acquisition process in this embodiment. Further, step S30 is also a vehicle speed acquisition process and an angular velocity acquisition process in this embodiment. As described above, the calculation acceleration variable is a variable related to the steering angle of wheels of the vehicle VC (as an example, the steering angle θt) as a variable indicating the driving state of the vehicle VC that generates the lateral acceleration of the vehicle VC. In a preferred embodiment, the image variation process is a process of changing the peripheral image 80 when the calculation acceleration variable indicates acceleration in a forward travelling of the vehicle VC with respect to when the vehicle VC is traveling at a constant speed. Further, the image variation process includes a process (S20, S22) for changing the amount of change of the peripheral image 80 according to the calculation acceleration variable in case where the front-rear acceleration is greater than zero, such that the magnitude of the front-rear acceleration when the amount of change in the peripheral image 80 is larger becomes greater than the magnitude of the front-rear acceleration when the amount of change in the peripheral image 80 is smaller.

In a preferred embodiment, when the steering angle θt deviates from zero, the image variation process includes a process for changing the peripheral image 80 with respect to when the vehicle VC is traveling straight. Further, when the steering angle θt is the same, the image variation process includes a process (S32, S34) of setting the amount of change to a different value depending on the vehicle speed SPD so that the vehicle speed when the amount of change in the peripheral image 80 is larger becomes greater than the vehicle speed when the amount of change is smaller.

Figure 6:
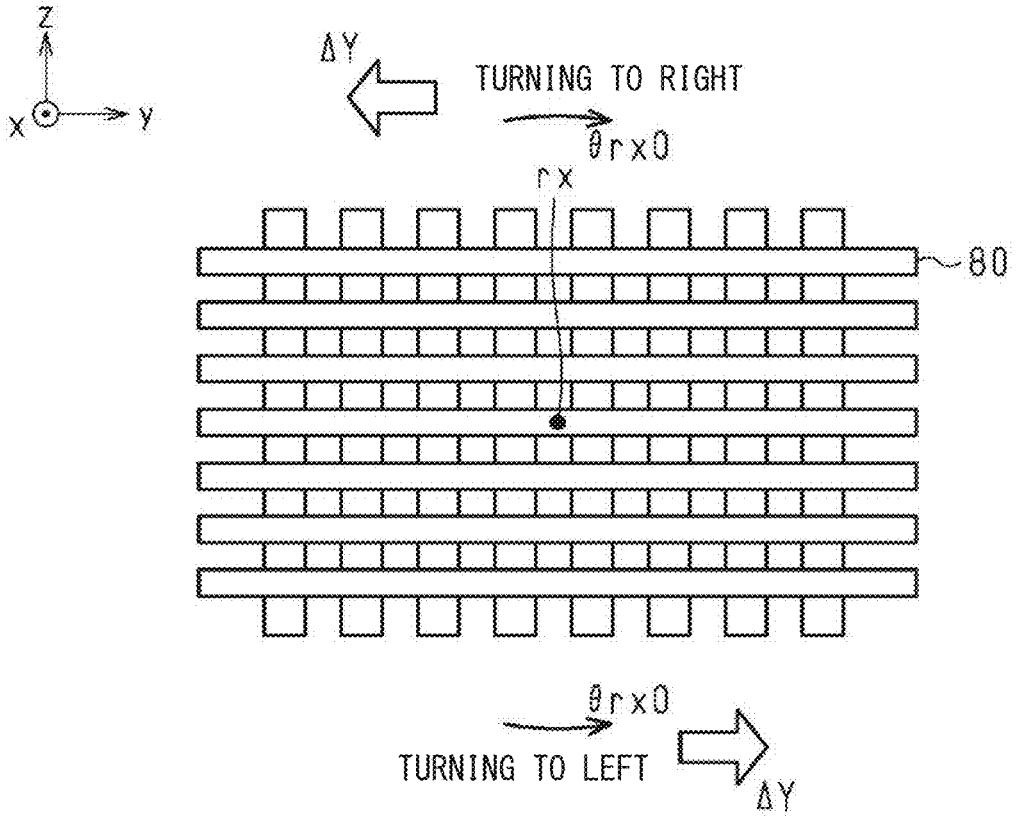
FIG. 6 is a diagram illustrating changes in a peripheral image according to a turning of the vehicle in the embodiment.

FIG. 6 illustrates the x-axis rotation amount θrx0 and the Y-direction displacement amount ΔY As shown in FIG. 6, when the vehicle VC turns to right, the CPU 22 rotates the peripheral image 80 clockwise around the rotation axis rx. As a result, the vertical stripes of the peripheral image 80 extend in the direction from the lower left to the upper right. This is because the direction of the composite vector of centrifugal force in the direction of leftward movement and gravitational acceleration deviates to the negative direction in the y-axis with respect to the negative z-axis direction, when the vehicle VC turns to right. Therefore, the occupant feels that his or her body is leaning toward the left side of the vehicle VC as the body is located upward. The peripheral image 80 is rotated to match the physical sensation. Further, when the vehicle VC turns to right, the CPU 22 displaces the peripheral image 80 to the left by the absolute value of the Y-direction displacement amount ΔY0.

Further, as shown in FIG. 6, when the vehicle VC turns to left, the CPU 22 rotates the peripheral image 80 counterclockwise about the rotation axis rx. As a result, the vertical stripes of the peripheral image 80 extend from the lower right to the upper left. This is because, the direction of the composite vector of centrifugal force in the direction of rightward movement and gravitational acceleration deviates to the positive direction in the y-axis with respect to the negative z-axis direction, when the vehicle VC turns to left. Therefore, the occupant feels that his or her body is leaning toward the right side of the vehicle VC as the body is located upward. The peripheral image 80 is rotated to match the physical sensation. Furthermore, when the vehicle VC turns to left, the CPU 22 displaces the peripheral image 80 to the right by the absolute value of the Y-direction displacement amount ΔY0.

Specifically, the CPU 22 monotonically increases the absolute value of the x-axis rotation amount θrx0 in accordance with the absolute value of the steering angle θt. This process includes a strong monotonicity increasing processing. This process is performed in consideration of the fact that the centrifugal force becomes larger when the absolute value of the steering angle θt is larger, compared with a case where the absolute value of the steering angle θt is smaller. Further, the CPU 22 monotonically increases the absolute value of the x-axis rotation amount θrx0 according to the vehicle speed SPD. This process includes a strong monotonicity increasing processing. This process is performed in consideration of the fact that when the vehicle speed SPD is high, the centrifugal force becomes larger, compared with a case where the vehicle speed SPD is low.

Further, the CPU 22 monotonically increases the absolute value of the Y-direction displacement amount ΔY0 in accordance with the absolute value of the steering angle θt. This process includes a strong monotonicity increasing processing. This process is performed in consideration of the fact that when the absolute value of the steering angle θt is larger, the yaw rate becomes larger, compared with a case where absolute value of the steering angle θt is smaller. Further, the CPU 22 monotonically increases the absolute value of the Y-direction displacement amount ΔY0 according to the vehicle speed SPD. This process includes a strong monotonicity increasing processing. This process is performed in consideration of the fact that when the vehicle speed SPD is higher, the yaw rate becomes larger, compared with a case where the vehicle speed SPD is lower.

The process of S32 in FIG. 5 may be realized, for example, by performing a map calculation on the x-axis rotation amount θrx0 by the CPU 22 while the map data is stored in the storage device 24. Here, the map data includes the steering angle θt and the vehicle speed SPD as input variables, and uses the x-axis rotation amount θrx0 as an output variable. Further, the process of S34 in FIG. 5 may be realized by, for example, performing a map calculation on the Y-direction displacement amount ΔY0 by the CPU 22 while the map data is stored in the storage device 24. Here, the map data includes the steering angle θt and the vehicle speed SPD as input variables, and uses the Y-direction displacement amount ΔY0 as an output variable.

The CPU 22 sets the time constant of the filter based on the steering angular velocity ωt (S36). The filter is provided to perform a low-pass filter processing on the x-axis rotation amount θrx0 and the Y-direction displacement amount ΔY0. The CPU 22 sets the cutoff frequency fc1, when the absolute value of the steering angular velocity ωt is smaller than a threshold value ωtth, to be larger than the cutoff frequency fc2 when the absolute value of the steering angular velocity ωt is equal to or higher than the threshold value ωtth. Step S36 is an example of responsiveness variable process in this embodiment. The responsiveness variable process is a process of changing the degree of decrease in responsiveness in accordance with the magnitude of the speed of change, when the CPU 22 executes the angular velocity acquisition process (S30) to acquire the speed of change of the steering angle θt, such that the magnitude of the speed of change becomes larger when the responsiveness of the change in the peripheral image 80 is larger compared with a case where the responsiveness is smaller.

The CPU 22 assigns the value obtained by low-pass filtering the x-axis rotation amount θrx0 to the x-axis rotation amount θrx (S38). Thereby, when the steering angular velocity ωt is smaller than the threshold value ωtth, the responsiveness of the x-axis rotation amount θrx is suppressed lower with respect to a change in the x-axis rotation amount θrx0, compared with a case where the steering angular velocity ωt is greater than or equal to the threshold value ωtth.

Further, the CPU 22 substitutes a value obtained by low-pass filtering the Y-direction displacement amount ΔY0 to the Y-direction displacement amount ΔY (S40). Thereby, when the steering angular velocity ωt is smaller than the threshold value ωtth, the responsiveness of the Y-direction displacement amount ΔY is suppressed with respect to a change in the Y-direction displacement amount ΔY0, compared with a case where the steering angular velocity ωt is greater than or equal to the threshold value ωtth. Steps S32 to S40 described above are also an example of display processing in this embodiment. Further, steps S32 to S40 are also an example of image variation process in this embodiment. Further, steps S36 to S40 are also an example of steering filter process in this embodiment. The steering filter process (S36 to S40) makes it possible to lower the responsiveness of changes in the peripheral image 80 with respect to changes in the steering angle θt.

When completing the process of S40, the CPU 22 temporarily ends the series of processes shown in FIG. 5.

"Process According to a Vertical Movement of the Vehicle"

Figure 7:
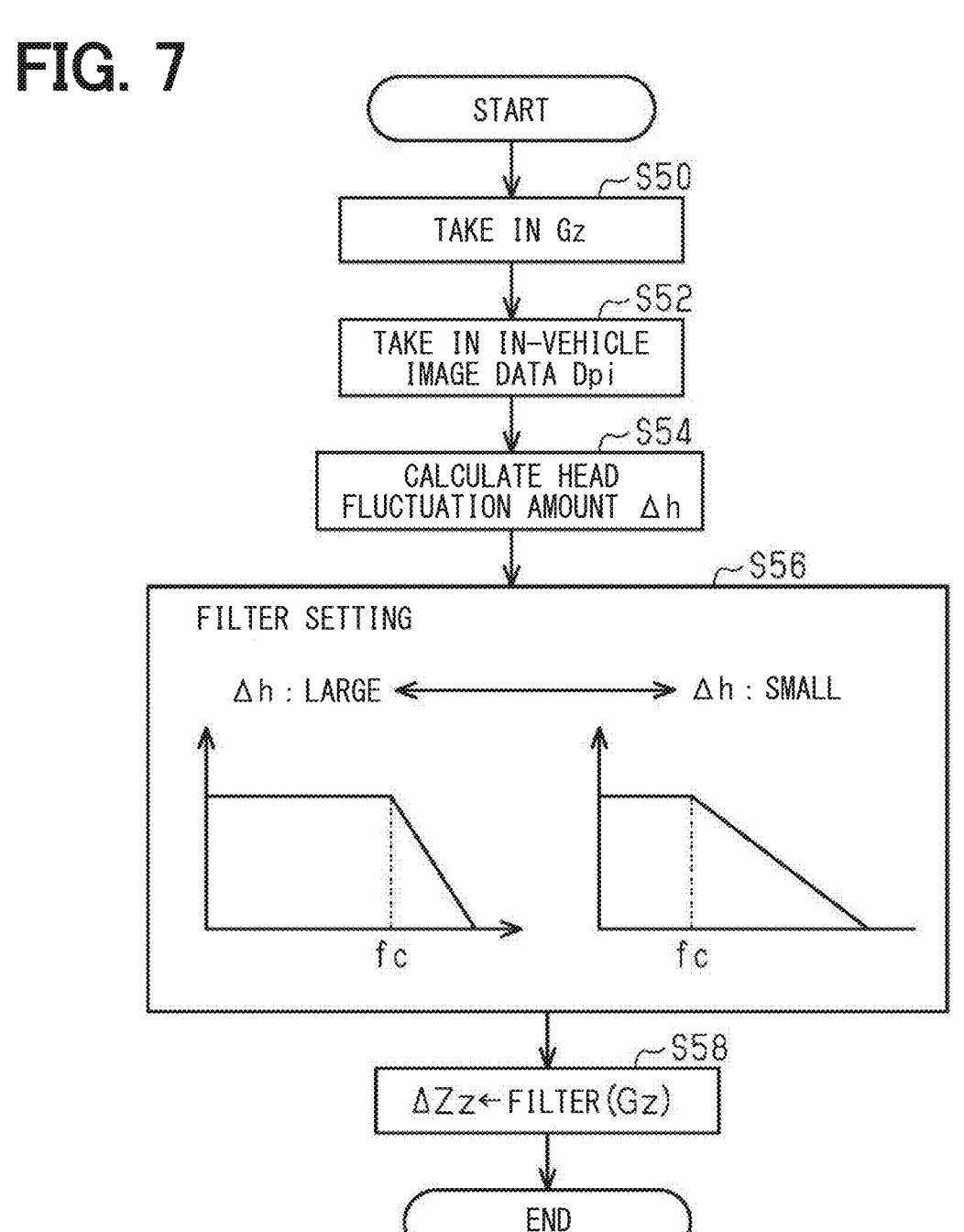
FIG. 7 is a flowchart showing a procedure of processing executed by a display control device according to the embodiment.

FIG. 7 shows a processing procedure according to the vertical movement of the vehicle VC. The process shown in FIG. 7 is realized by the CPU 22 repeatedly executing the image display program 24a stored in the storage device 24, for example, at a predetermined period.

In the series of processes shown in FIG. 7, the CPU 22 takes in the vertical acceleration Gz (S50). Next, the CPU 62 takes in the in-vehicle image data Dpi (S52). In the process of S52, time-series data of the in-vehicle image data Dpi is taken in. Then, the CPU 22 substitutes the difference between the maximum value and the minimum value of the displacement of the head of the occupant in the z-axis direction during a predetermined period into a head fluctuation amount Δh based on the time series data of the in-vehicle image data Dpi (S54). Step S50 described above is an example of the vertical G acquisition process in this embodiment. Further, steps S52 and S54 are also an example of head behavior acquisition process in this embodiment. In the head behavior acquisition process, the CPU 22 acquires the output signal Dpi of the in-vehicle camera 32, which is a sensing device that senses the behavior of the head of the occupant in the vehicle VC.

Next, the CPU 22 sets a time constant for low-pass filtering the vertical acceleration Gz according to the head fluctuation amount Δh (S56). The CPU 22 monotonically increases the cutoff frequency fc according to the head fluctuation amount Δh. This process includes a strong monotonicity increasing processing. In this embodiment, the vertical filter process includes a process (S56) of changing the responsiveness according to the head fluctuation amount Δh, which is the amount of variation in the position of the head, so that the head fluctuation amount Δh becomes smaller when the responsiveness of the displacement of the peripheral image 80 with respect to the vertical acceleration is higher, compared with a case where the responsiveness is lower.

The CPU 22 substitutes the value obtained by low-pass filtering the vertical acceleration Gz into the Z-direction displacement amount ΔZz (S58). The Z-direction displacement amount ΔZz is a displacement amount that displaces the peripheral image 80 in the Z-direction in accordance with the vertical displacement of the vehicle VC. Steps S54 to S58 described above are also an example of display processing in this embodiment. Further, steps S54 to S58 are also an example of image variation process in this embodiment. Further, steps S56 and S58 are also an example of the vertical filter process in this embodiment. In the vertical filter process, the CPU 22 lowers the responsiveness of vertical changes in the peripheral image 80 with respect to changes in detected values.

According to the process of S56, when the head fluctuation amount Δh is large, the high frequency component of the vertical acceleration Gz is suppressed from being reflected in the Z-direction displacement amount ΔZz, compared with a case where the head fluctuation amount Δh is small. This is intended to restrict the occupant from feeling bothered by the phase shift between the line of sight and the peripheral image 80.

Specifically, the process of S56 may be realized by performing a map calculation on the value of the variable that determines the time constant of the filter by the CPU 22 while the map data is stored in the storage device 24. Here, the map data uses the head fluctuation amount Δh as an input variable, and uses the value of a variable that determines a time constant as an output variable.

When the process of S58 is completed, the CPU 22 temporarily ends the series of processes shown in FIG. 7.

"Displacement Process of Peripheral Image"

Figure 8:
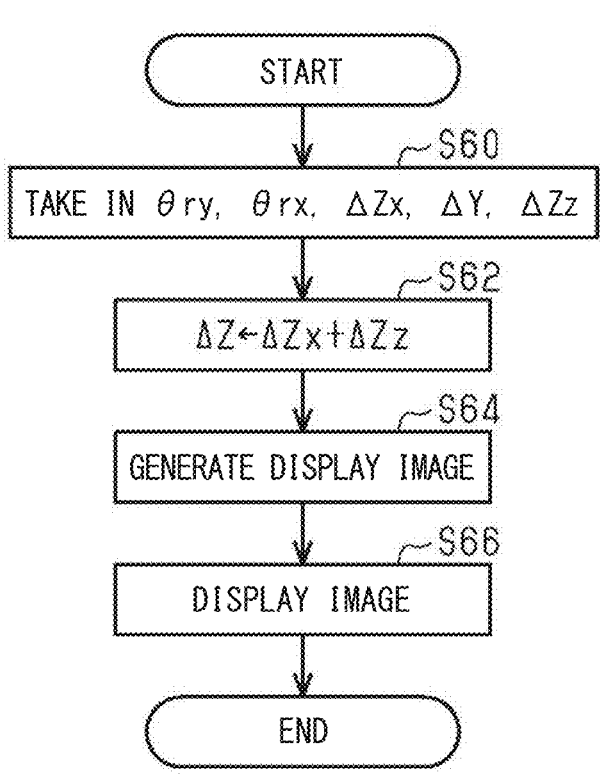
FIG. 8 is a flowchart showing a procedure of processing executed by a display control device according to the embodiment.

FIG. 8 shows the procedure for displacement process of peripheral image. The process shown in FIG. 8 is realized by the CPU 22 repeatedly executing the image display program 24a stored in the storage device 24, for example, at a predetermined period.

In the series of processes shown in FIG. 8, the CPU 22 takes in the y-axis rotation amount θry, the x-axis rotation amount θrx, the Z-direction displacement amounts ΔZx, ΔZz, and the Y-direction displacement amount ΔY (S60). Next, the CPU 22 substitutes the sum of the Z-direction displacement amount ΔZx and the Z-direction displacement amount ΔZz into the Z-direction displacement amount ΔZ (S62).

The CPU 22 generates the peripheral image 80 to be displayed on the display device 26 according to the y-axis rotation amount θry, the x-axis rotation amount θrx, the Z-direction displacement amount ΔZ, and the Y-direction displacement amount ΔY (S64). The peripheral image 80 for display is an image rotated by the y-axis rotation amount θry around the rotation axis ry. Furthermore, the peripheral image 80 for display is an image rotated by the x-axis rotation amount θrx around the rotation axis rx. Furthermore, the peripheral image 80 for display is an image displaced in the Z-axis direction by the Z-direction displacement amount $\Delta Z$. Furthermore, the peripheral image 80 for display is an image displaced in the Y-axis direction by the Y-direction displacement amount $\Delta Y$ Steps S60 to S64 described above are also an example of image variation process in this embodiment.

Next, the CPU 22 displays the image generated by the process of S64 by operating the display device 26 (S66).

When the process of S66 is completed, the CPU 22 temporarily ends the series of processes shown in FIG. 8. Steps S60 to S66 described above are also an example of display processing in this embodiment.

The action and effect of the present embodiment will be described.

The CPU 22 sets the y-axis rotation amount $\theta ry$ and the Z-direction displacement amount $\Delta Zx$ based on the display front-rear acceleration Gxr as a calculation acceleration variable. The display front-rear acceleration Gxr is the required front-rear acceleration Gx* generated by the automatic driving process or the estimated front-rear acceleration Gxe predicted by the accelerator operation amount ACCP. The y-axis rotation amount $\theta ry$ and the Z-direction displacement amount $\Delta Zx$ that are set according to the display front-rear acceleration Gxr can easily raise the responsiveness compared to the y-axis rotation amount $\theta ry$ and the Z-direction displacement amount $\Delta Zx$ that are set according to the detected value of the sensor that detects the front-rear acceleration. That is, there is a possibility that a response delay may occur in the detection value of the front-rear acceleration sensor that detects front-rear acceleration according to the force acting on itself. Further, the time required to generate and display the peripheral image 80 according to the detected value of the sensor may also be a factor in response delay. On the other hand, the display front-rear acceleration Gxr is a variable that indicates the behavior of the vehicle VC in the near future. Furthermore, the short time required for the displayed front-rear acceleration Gxr to become the actual front-rear acceleration of the vehicle VC can be adjusted as appropriate. Therefore, by setting the y-axis rotation amount $\theta ry$ and the Z-direction displacement amount $\Delta Zx$ according to the display front-rear acceleration Gxr, it is possible to sufficiently suppress the response delay in displaying the peripheral image 80 with respect to the behavior of the vehicle VC.

Further, the CPU 22 sets the x-axis rotation amount $\theta rx$ and the Y-direction displacement amount $\Delta Y$ based on the steering angle $\theta t$. This makes it easier to improve the responsiveness of the display of the peripheral image 80 with respect to the behavior of the vehicle VC, compared to setting the x-axis rotation amount $\theta rx$ and the Y-direction displacement amount $\Delta Y$ based on a sensor that detects lateral acceleration or a yaw rate sensor. This is because the steering angle $\theta t$ is a variable that determines the behavior of the vehicle VC in the near future.

According to the present embodiment, the actions and effects described below can be obtained.

(1) The CPU 22 takes into account the vehicle speed SPD when setting the x-axis rotation amount $\theta rx$ and the Y-direction displacement amount $\Delta Y$ The magnitude of the lateral acceleration and the magnitude of the yaw rate are not determined only from the steering angle $\theta t$, but depend on the vehicle speed SPD. Therefore, by taking the vehicle speed SPD into account, the behavior of the vehicle VC can be reflected in the display more faithfully in the display of the peripheral image 80 compared to the case where the x-axis rotation amount $\theta rx$ and the Y-direction displacement amount $\Delta Y$ are set based only on the steering angle $\theta t$.

(2) The CPU 22 sets the values obtained by filtering the x-axis rotation amount $\theta rx0$ and the Y-direction displacement amount $\Delta Y0$ as the x-axis rotation amount $\theta rx$ and the Y-direction displacement amount $\Delta Y$ Thereby, it is possible to suppress excessive fluctuations in the peripheral image 80 due to the influence of noise included in the steering angle $\theta t$.

(3) The CPU 22 sets the time constant of the filter when filtering the x-axis rotation amount $\theta rx0$ and the Y-direction displacement amount $\Delta Y0$ according to the steering angular velocity $\omega t$. The CPU 22 decreases the cutoff frequency by the low-pass filter process when the absolute value of the steering angular velocity $\omega t$ is larger, compared with a case where the absolute value of the steering angular velocity $\omega t$ is small. This makes it possible to achieve a suitable compromise between suppressing the influence of noise included in the steering angle $\theta t$ and quickly reflecting the behavior of the vehicle VC determined by the steering angle $\theta t$ on the peripheral image 80.

(4) The CPU 22 sets the Z-direction displacement amount $\Delta Zx$ based on the filtered value of the vertical acceleration Gz. Thereby, it is possible to suppress excessive displacement of the peripheral image 80 in the vertical direction depending on the condition of the road surface and the like.

(5) The CPU 22 sets the time constant of the filter for filtering the vertical acceleration Gz in accordance with the head fluctuation amount $\Delta h$. As a result, compared to the case where the time constant is fixed, it is possible to more preferably suppress the occupant from feeling bothered by the phase shift between the line of sight and the peripheral image 80.

Other Embodiment

The above embodiment may be modified as follows. The above embodiment and the following modifications can be implemented in combination with one another as long as there is no technical contradiction.

"Calculation Acceleration Variable"

(a) Regarding Steering Angle

In the above embodiment, the steering angle $\theta t$ detected by the steering angle sensor 42 is used as an input for the variation process of the peripheral image 80, but is not limited to this. For example, in a vehicle equipped with a steer-by-wire system, a command value for the steering angle may be input. However, in a vehicle equipped with a steer-by-wire system, the command value for the steering angle may not be input.

(b) Regarding Estimated Front-Rear Acceleration Gxe

The estimated front-rear acceleration Gxe is not limited to be calculated based on the accelerator operation amount ACCP. For example, the accelerator operation amount ACCP may not be essential if the acceleration is calculated based on the torque or output of the vehicle-mounted prime mover.

It may not be essential to calculate the estimated front-rear acceleration Gxe using the brake operation amount Brk as input. For example, when the braking system 78 includes a hydraulic actuator, a hydraulic pressure command value or a hydraulic pressure detection value may be input to the calculation process of the estimated front-rear acceleration Gxe instead of the brake operation amount Brk.

The estimated front-rear acceleration Gxe is not limited to one calculated based on the brake operation amount Brk or the oil pressure of the hydraulic actuator. For example, in a vehicle equipped with a rotating electrical machine, when obtaining braking force through regenerative control of the rotating electrical machine, the estimated front-rear acceleration Gxe may be calculated based on the regenerative torque or regenerative power of the rotating electrical machine.

"Image Variation Process"

(a) Regarding Process that Takes as Input a Variable Indicating Front-Rear Acceleration According to Commands to the Drive System and Braking System When not in the automatic driving mode, the y-axis rotation amount θry and the Z-direction displacement amount ΔZx may not be set using the estimated front-rear acceleration Gxe as input. For example, the y-axis rotation amount θry and the Z-direction displacement amount ΔZx may be set simply by inputting the accelerator operation amount ACCP and the brake operation amount Brk. The CPU 22 may, for example, monotonically increase the absolute value of the y-axis rotation amount θry and the absolute value of the Z-direction displacement amount ΔZx according to the accelerator operation amount ACCP or the brake operation amount Brk. In that case, this process includes a strong monotonicity increasing processing.

For example, the y-axis rotation amount θry and the Z-direction displacement amount ΔZx may be set in consideration of the vehicle speed SPD. In that case, for example, the absolute value of the y-axis rotation amount θry and the absolute value of the Z-direction displacement amount ΔZx may be monotonically increased in accordance with the vehicle speed SPD. In that case, this process includes a strong monotonicity increasing processing. This can be realized, for example, using map data that uses the vehicle speed SPD, the accelerator operation amount ACCP, and the brake operation amount Brk as input variables.

In the above embodiment, the input for the process for calculating the y-axis rotation amount θry and the input for the process for calculating the Z-direction displacement amount ΔZx are the same, but not limited to this. For example, the input for the process for calculating the y-axis rotation amount θry may be the display front-rear acceleration Gxr, while the input for the process for calculating the Z-direction displacement amount ΔZx may be the accelerator operation amount ACCP and the brake operation amount Brk.

In the above embodiment, the peripheral image 80 is rotated around the rotation axis ry and translated in parallel in the Z-axis direction based on variables indicating front-rear acceleration according to commands to the drive system and the brake system, but not limited to this. For example, although the peripheral image 80 is rotated about the rotation axis ry based on a variable indicating front-rear acceleration, the process of translating it in the Z-axis direction may not be performed. For example, although the peripheral image 80 is translated in the Z-axis direction based on a variable indicating front-rear acceleration, the process of rotating the peripheral image 80 around the rotation axis ry may not be performed.

A value detected by a sensor of front-rear acceleration Gx may be used as at least one of the input in the process of calculating the y-axis rotation amount θry and the input in the process of calculating the Z-direction displacement amount ΔZx. Even in that case, for example, the responsiveness of the display of the peripheral image 80 can be improved by determining the x-axis rotation amount θrx and the Y-direction displacement amount ΔY according to the command value of the steering angle.

For example, only when the detected value of the front-rear acceleration Gx by the sensor is negative, at least one of the input in the process of calculating the y-axis rotation amount θry and the input in the process of calculating the Z-direction displacement amount ΔZx based on the detected value may be performed. In other words, only when the vehicle VC is decelerating, at least one of the processing input for calculating the y-axis rotation amount θry and the processing input for calculating the Z-direction displacement amount ΔZx may be executed. In that case, when accelerating the vehicle VC, at least one of the input in the process of calculating the y-axis rotation amount θry and the input in the process of calculating the Z-direction displacement amount ΔZx may be executed based on the display front-rear acceleration Gxr.

It may not be essential that the rotation axis ry be located at the center of the display panel in the up-down direction.

(b) Regarding Process During a Turning of the Vehicle

In the above embodiment, two time constants are prepared for filter, but not limited to this. For example, by preparing three or more, the time constant may be changed in multiple stages based on the steering angular velocity ωt. At this time, the cutoff frequency fc may be monotonically decreased according to the absolute value of the turning angular velocity ωt. However, this process includes a strong monotonicity decreasing processing.

In the above embodiment, the x-axis rotation amount θrx0 and the Y-direction displacement amount ΔY0 are input to the filter processing, but not limited thereto. For example, the steering angle θt may be used as an input for filter processing, and the output of the filter processing may be used as an input for processing for calculating the x-axis rotation amount θrx and the Y-direction displacement amount ΔY.

It may not be essential to make the filter time constant variable in the filter processing. Even if it is not made variable, it is possible to suppress the influence of noise in the steering angle θt from affecting the display of the peripheral image 80.

It may not be essential to perform the filter processing. For example, the x-axis rotation amount θrx and the Y-direction displacement amount ΔY may be directly calculated using the steering angle θt and the vehicle speed SPD as input. Further, for example, although the x-axis rotation amount θrx is calculated by filtering the x-axis rotation amount θrx0, the Y-direction displacement amount ΔY may be directly calculated using the steering angle θt and the vehicle speed SPD as input.

In the above embodiment, the x-axis rotation amount θrx0 and the Y-direction displacement amount ΔY0 are set using the steering angle θt and the vehicle speed SPD as inputs, but not limited to this. For example, although the steering angle θt is input, the vehicle speed SPD may not be included in the input.

In the above embodiment, the input for the process for calculating the x-axis rotation amount θrx0 and the input for the process for calculating the Y-direction displacement amount ΔY0 are the same, but not limited to this. For example, the input for the process of calculating the x-axis rotation amount θrx0 may be the steering angle θt and the vehicle speed SPD, while the input for the process for calculating the Y-direction displacement amount ΔY0 may be only the steering angle θt.

In the above embodiment, as the vehicle VC turns, the peripheral image 80 is rotated about the rotation axis rx and translated in parallel in the y-axis direction, but not limited to this. For example, as the vehicle VC turns, the peripheral image 80 is rotated about the rotation axis rx, but the process of translating it in the y-axis direction may not be performed. Further, for example, although the peripheral image 80 is translated in the y-axis direction as the vehicle VC turns, the process of rotating the peripheral image 80 about the rotation axis rx may not be performed.

The value detected by the sensor of the lateral acceleration Gy may be used as at least one of the input in the process of calculating the x-axis rotation amount θrx0 and the input in the process of calculating the Y-direction displacement amount ΔY Even in that case, for example, the responsiveness of the display of the peripheral image 80 can be improved by setting at least one of the y-axis rotation amount θry and the Z-direction displacement amount ΔZx based on a variable indicating the front-rear acceleration in response to the command to the driving system and the braking system.

It may not be essential that the rotation axis rx passes through the center of the display panel.

(c) Regarding Process Related to Vertical Vibration of the Vehicle

In the above embodiment, the input for the process of changing the time constant of the filter is the difference between the local maximum value and the local minimum value of the head, but not limited to this. For example, it may be the time from when the head reaches either one of the local maximum value and the local minimum value until the head reaches the other.

It may not be essential to make the time constant of the filter variable when filtering the vertical acceleration Gz.

It may not be essential to set the Z-direction displacement amount ΔZz to a value obtained by filtering the vertical acceleration Gz. For example, the coordinate value of a predetermined location on the head may be input and the amount of displacement may be used as the amount of displacement in the Z direction. However, it may not be essential to determine the Z-direction displacement amount ΔZz in accordance with the vertical acceleration Gz or the displacement of the head.

(d) About Image

In FIG. 2, a monochrome checkered pattern image is illustrated as the peripheral image 80, but the peripheral image 80 is not limited to this. For example, the peripheral image 80 may be a checkered pattern consisting of plural colors. However, the peripheral image 80 is not limited to a checkered pattern image made of a single color or plural colors.

In the above embodiment, the image for suppressing car sickness is the peripheral image 80 arranged around the moving image desired by the occupant of the vehicle VC, but not limited to this. For example, an image for suppressing car sickness may be displayed at a position visible to the occupant without displaying a video desired by the occupant. This image may be a checkered pattern image illustrated in FIG. 2, but is not limited thereto. For example, it may be an image of a predetermined object such as a person, cat, ball, or building.

(e) Regarding Image Variation Process

It may not be necessary to do all of the process of rotating an image for suppressing car sickness around the rotation axis ry, the process of rotating it around the rotation axis rx, the process of parallel translation in the Z direction, and the process of parallel translation in the Y direction.

It may not be essential to display an image for suppressing car sickness as if it were three-dimensionally displaced on a two-dimensional plane. For example, if the display device is VR goggles as described in the section "About display device" below, image fluctuations can be expressed by making the image for the left eye and the image for the right eye different.

"About Display Control Device"

It may not be essential for the display control device to include a display device.

The display control device is not limited to one that includes the CPU 22 and the storage device 24 and executes software processing. For example, a dedicated hardware circuit such as an ASIC may be provided to execute a hardware process for at least part of the software process in the above embodiment. That is, the display control device may have any of the following configurations (a) to (c):

(a) the display control device includes a processing device that executes all of the above processing according to a program, and a program storage device such as a ROM that stores the program;

(b) the display control device includes a processing device and a program storage device that execute part of the above processing according to a program, and a dedicated hardware circuit that executes the remaining processing; and (c) the display control device includes a dedicated hardware circuit provided to execute all of the above processing.

There may be multiple software execution devices provided with the process device and the program storage device, or multiple dedicated hardware circuits. The computer program may be stored in a computer-readable non-transitory tangible recording medium as an instruction to be executed by a computer.

"About Display Device"

The display device is not limited to a display such as a liquid crystal or LED provided on the seat back. For example, the display device may be a projector that projects an image onto the seat back.

The area where the display device displays images is not limited to the seat back. For example, the display area may be formed by a member extending downward from the ceiling of the vehicle VC.

The display device is not limited to one that physically partitions the display area. For example, the display device may be a VR goggle worn by an occupant of the vehicle.

In this specification, the statement "at least one of A and B" should be understood to mean "only A, only B, or both A and B."

Although the present disclosure has been described in accordance with the examples, it is understood that the present disclosure is not limited to such examples or structures. The present disclosure encompasses various modifications and variations within the scope of equivalents. Furthermore, various combinations and formations, and other combinations and formations including one or more than one or less than one element may be included in the scope and the spirit of the present disclosure.

What is claimed is:

1. A display control device comprising:
at least one of (i) a circuit and (ii) a processor having a memory storing computer program code, wherein the at least one of the circuit and the processor having the memory is configured to cause the display control device to execute a calculation acceleration acquisition processing and a display processing, wherein the calculation acceleration acquisition processing includes a process of acquiring a calculation acceleration variable, the calculation acceleration variable includes a variable indicating a calculated acceleration of a vehicle in response to a driving state of the vehicle, or a driving state of the vehicle that generates an acceleration of the vehicle, the display processing includes a process of displaying an image that is visible to an occupant of the vehicle by operating a display device, and includes an image variation process, the image variation process includes a process of changing the image in response to the calculation acceleration variable, the calculation acceleration variable includes a variable related to a steering angle of a steering wheel of the vehicle as a variable indicating a driving state of the vehicle that generates a lateral acceleration of the vehicle, and in a case where the steering angle deviates from zero, the image variation process includes a process of changing the image with respect to a straight traveling of the vehicle, and includes a process of changing an amount of change in the image in response to the steering angle, when a magnitude of the steering angle is greater than zero, such that the magnitude of the steering angle becomes larger when the amount of change in the image is larger than when the amount of change in the image is smaller, wherein the image variation process includes a steering filter process to lower a responsiveness of change in the image with respect to a change in the steering angle.

2. The display control device according to claim 1, wherein the calculation acceleration variable includes a variable indicating an acceleration of the vehicle in a front-rear direction in response to a command to a driving system of the vehicle, and in a case where the calculation acceleration variable indicates an acceleration in a forward travelling of the vehicle, the image variation process includes a process of changing the image with respect to a travelling of the vehicle at a constant speed, and includes a process of changing an amount of change in the image in response to the calculation acceleration variable, when the acceleration is greater than zero, such that a magnitude of the acceleration becomes larger when the amount of change in the image is larger than when the amount of change in the image is smaller.

3. The display control device according to claim 1, wherein the at least one of the circuit and the processor having the memory is configured to cause the display control device to execute a vehicle speed acquisition process to acquire a traveling speed of the vehicle, and in the case where the steering angle deviates from zero, the image variation process includes a process of changing the image with respect to a straight traveling of the vehicle, and includes a process of setting an amount of change in the image to a different value in response to the traveling speed of the vehicle, while the steering angle is the same, such that the traveling speed of the vehicle becomes larger when the amount of change is larger than when the amount of change is smaller.

4. The display control device according to claim 1 wherein the at least one of the circuit and the processor having the memory is configured to cause the display control device to execute an angular velocity acquisition process to acquire a change speed of the steering angle, and the steering filter process includes a responsiveness variable process to change a degree of decrease in the responsiveness in response to a magnitude of the change speed, such that the magnitude of the change speed becomes larger when the responsiveness is higher than when the responsiveness is lower.

5. The display control device according to claim 1, wherein the at least one of the circuit and the processor having the memory is configured to cause the display control device to execute a vertical G acquisition process to acquire a detection value of an acceleration sensor that detects an acceleration of the vehicle in an up-down direction, and the image variation process includes a process of displacing the image in the up-down direction of the vehicle in response to the detection value.

6. A display control device comprising:

at least one of (i) a circuit and (ii) a processor having a memory storing computer program code, wherein the at least one of the circuit and the processor having the memory is configured to cause the display control device to execute a calculation acceleration acquisition processing and a display processing, wherein the calculation acceleration acquisition processing includes a process of acquiring a calculation acceleration variable, the calculation acceleration variable includes a variable indicating a calculated acceleration of a vehicle in response to a driving state of the vehicle, or a driving state of the vehicle that generates an acceleration of the vehicle, the display processing includes a process of displaying an image that is visible to an occupant of the vehicle by operating a display device, and includes an image variation process, the image variation process includes a process of changing the image in response to the calculation acceleration variable, the at least one of the circuit and the processor having the memory is configured to cause the display control device to execute a vertical G acquisition process to acquire a detection value of an acceleration sensor that detects an acceleration of the vehicle in an up-down direction, the image variation process includes a process of displacing the image in the up-down direction of the vehicle in response to the detection value, and the at least one of the circuit and the processor having the memory is configured to cause the display control device to execute a vertical filter process to reduce a responsiveness of change in the image in the up-down direction with respect to a change in the detection value.

7. The display control device according to claim 6, wherein the at least one of the circuit and the processor having the memory is configured to cause the display control device to execute a head behavior acquisition process of acquiring an output signal of a sensing device that senses a behavior of a head of an occupant in the vehicle, and the vertical filter process includes a process of changing a responsiveness of a displacement of the image with respect to an acceleration in the up-down direction, in response to an amount of variation in a position of the head, such that the amount of variation becomes smaller when the responsiveness is higher than when the responsiveness is lower.

8. The display control device according to claim 1, wherein the image is a peripheral image displayed around an image desired by an occupant of the vehicle.

9. An image display method comprising executing each of the calculation acceleration acquisition processing and the display processing in the display control device according to claim 1.

10. A non-transitory storage medium storing an image display program that causes a computer to execute each of the calculation acceleration acquisition processing and the display processing in the display control device according to claim 1.

11. The display control device according to claim 6, wherein the image is a peripheral image displayed around an image desired by an occupant of the vehicle.

12. An image display method comprising executing each of the calculation acceleration acquisition processing and the display processing in the display control device according to claim 6.

13. A non-transitory storage medium storing an image display program that causes a computer to execute each of the calculation acceleration acquisition processing and the display processing in the display control device according to claim 6.

* * * * *